Oct. 7, 1958  R. A. FINDLAY  2,855,100
FRACTIONAL CRYSTALLIZATION PROCESS AND APPARATUS
Filed Dec. 31, 1954
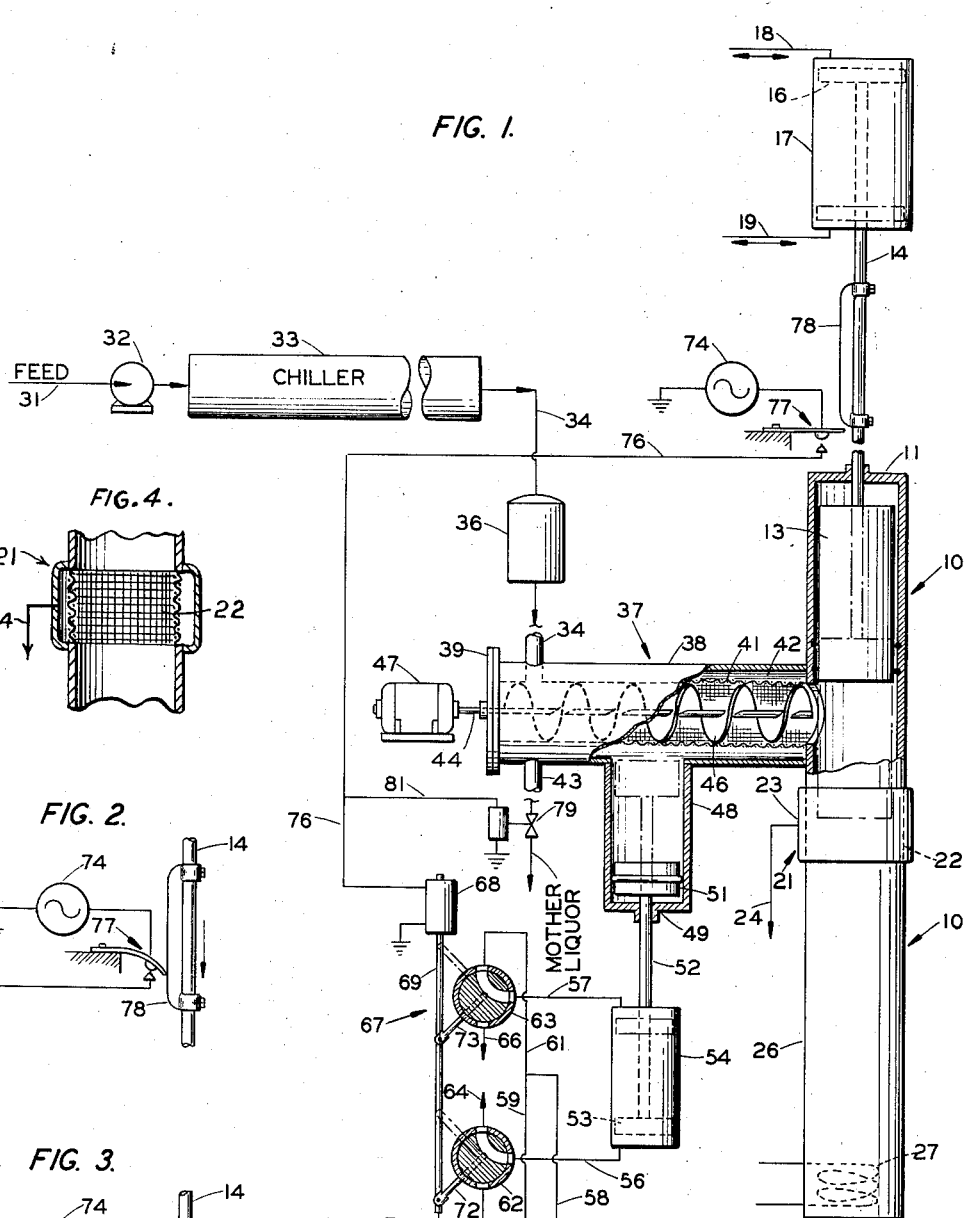
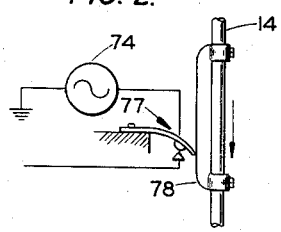
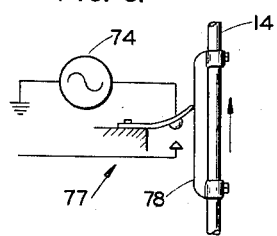
INVENTOR.
R. A. FINDLAY
BY *Hudson and Young*
ATTORNEY.

2,855,100

FRACTIONAL CRYSTALLIZATION PROCESS AND APPARATUS

Robert A. Findlay, Bartlesville, Okla., assignor to Phillips Petroleum Company, a corporation of Delaware Application December 31, 1954, Serial No. 478,987

10 Claims. (Cl. 210—67)

This invention relates to the separation and purification of components of liquid multi-component mixtures. In one of its more specific aspects, it relates to the separation and purification of components of a liquid multi-component mixture by fractional crystallization. In another of its more specific aspects, it relates to fractional crystallization apparatus comprising improved means for crystal separation. In still another of its more specific aspects, it relates to a method for increasing the filtering rate of an in-line type prefilter used in fractional crystallization apparatus.

The separation of chemical compounds by means of crystallization finds many applications in industrial installations. While many separations can be made by distillation or solvent extraction, there are cases where these methods are impracticable or impossible, and the desired separation can be effected more advantageously by means of crystallization. Thus, in the case of chemical isomers having similar boiling points and solubilities, or materials having relatively high boiling ranges, or thermally unstable substances, separation by crystallization may well be the only method which can be advantageously employed.

As well as offering in many cases perhaps the only practicable method of separation, the crystallization method offers the further advantage of being the only separation method which theoretically gives a pure product in a single stage of operation. In actual practice, however, the crystals obtained from a solution of several components will be impure because of the occlusion of mother liquor within the crystal interstices. In the conventional fractional crystallization processes, the crystal yield from one batch crystallization is redissolved in a solvent or remelted and again crystallized to effect further purification. The recrystallized product will have less impurity since the concentration of impurity in the new liquor is less than in the previous liquor of crystallization. Such processes require a large amount of equipment and floor space for their operation with resulting high operating expenditures in terms of labor and equipment costs. Furthermore, in these types of processes, the purity of the product is limited by the number of stages through which the process is carried.

More recently, a continuous method of separating and purifying liquid multi-component mixtures has been advanced which overcomes the disadvantages of conventional fractional crystallization processes. This method involves cooling a liquid component mixture from which the separation is to be made so as to form crystals of at least the higher melting component and thereafter separating crystals from the mother liquor. The crystals are then introduced into a purification section in one end of which a melting section is maintained. The crystals are moved through the purification section toward the melting section where the crystals are melted, and a portion of the melt is withdrawn as product. The remainder of the melt is displaced as a reflux stream countercurrently to the movement of the crystals and in intimate contact therewith so as to remove occluded impurities.

When practicing the above described crystal separation and purification method, it is sometimes desirable to supply the separation and purification column with a thick rather than a thin slurry of crystals and mother liquor. Accordingly, a prefiltering means is often used in combination with the separation and purification column in order that mother liquor may be separated from the crystals prior to introduction into the column for further separation and purification. While it has been found that in-line filters as used in crystal separation and purification columns operate very efficiently and show good filter rates, their use as prefilters has not been entirely satisfactory because clogging of the filter screen with crystals results in greatly reduced filter rates. In accordance with this invention, an improved in-line type prefilter is provided for use with fractional crystallization apparatus.

The following are objects of the invention.

It is an object of the invention to provide improved fractional crystallization apparatus.

Another object of the invention is to provide an improved process for the separation and purification of components of liquid multi-component mixtures.

Still another object of the invention is to provide fractional crystallization apparatus comprising an improved in-line type prefilter.

Yet another object of the invention is to provide an improved in-line type filter which includes means for cleaning the filter medium so as to prevent clogging thereof with crystals.

A further object of the invention is to provide a means and method for synchronizing the operation of a prefiltering means with that of a crystal separation and purification column of fractional crystallization apparatus.

Still other objects and advantages of the invention will become apparent to those skilled in the art from the following disclosure.

Broadly speaking, the present invention is directed to the separation and purification of components of liquid multi-component mixtures and involves improving the filter rate at which mother liquor is separated from crystals prior to introduction of the crystals into a crystal separation and purification column. It has been found that an improvement of 50 percent and more in filter rate can be obtained when operating an in-line filter as described hereinafter. In accordance with a broad aspect, the invention comprises intermittently causing filtered liquid to flow back through the filter medium and dislodge solid material embedded therein. More specifically, the invention resides in improved fractional crystallization apparatus comprising an in-line type prefilter having a piston attached to its side so that movement of the piston forces filtrate back through the filter medium and into the slurry being filtered, thereby dislodging any crystals which may have become lodged in the filter medium. In one embodiment of the invention, control means are provided for synchronizing the movement of the crystal mover in a separation and purification column with the backwash piston of the prefilter so that the backwash liquid may be automatically applied to the filter medium at a time when the backwashing is most effective.

The process and apparatus of this invention are applicable to a vast number of simple binary and complex multi-component systems. The invention is particularly applicable to the separation of hydrocarbons which have practically the same boiling points, and are, therefore, difficult to separate by distillation. Where high boiling organic compounds are concerned, separation by distillation is often undesirable because many such compounds are unstable at high temperatures. Specific examples of organic systems to which this invention is applicable are recited in U. S. application, Serial No. 166,992, filed June 9, 1950, now Patent No. 2,747,001, and of particular importance, there may be mentioned separation of systems containing xylenes, systems containing cyclohexane, systems containing normal paraffins, and systems containing benzene, and the like. Thus, para-xylene can be separated from a multi-component mixture comprising isomeric alkyl benzenes, e. g., from a mixture of para- and meta-xylenes or from para-, meta-, and orthoxylenes. In the same manner, benzene can be separated from a mixture comprising a paraffinic hydrocarbon such as n-hexane or n-heptane and benzene, and cyclohexane can be separated from a mixture comprising cyclohexane and paraffinic hydrocarbons such as isomeric hexanes boiling close to cyclohexane. Other organic chemicals that may be mentioned include pyridines, dimethylphthalates and fatty acids.

It is not intended, however, to limit the invention to organic mixtures, but rather it is applicable to inorganic mixtures as well, and offers a practical method of separating two inorganic components between which solvates or hydrates are formed. Examples of inorganic systems to which this invention is applicable are those for the recovery of pure salts, such as ammonium nitrate, and of anhydrous salts from their hydrates.

In certain cases, it may also be desirable to recover the mother liquor separated from the crystals as a product of the process. This situation arises where it is desired to increase the concentration of a dilute solution. This aspect of the invention is especially applicable to the production of concentrated food products which involves primarily the removal of water from these products. Accordingly, by utilizing the process of this invention, water can be removed from fruit juices such as grape, orange, lemon, pineapple, apple and tomato. It is also possible to concentrate vegetable juices and beverages such as milk, beer, wine, coffee and tea by this method. The desired degree of concentration can be closely controlled by varying the amount of liquid passed upwardly through the downwardly moving mass of crystals. This aspect of this invention is in general applicable in those instances where it is desired to increase the concentration of a solution by removing at least a portion of the solvent therefrom.

For a more complete understanding of the invention, reference may be had to the following description and the drawing, in which:

Figure 1 is an elevation, partly in section, of fractional crystallization apparatus illustrating the present invention;

Figures 2 and 3 are partial elevational views of the apparatus of Figure 1 illustrating the operation of the control mechanism; and Figure 4 is a partial elevational view in section of the filter section of the fractional crystallization apparatus of Figure 1.

Referring to Figure 1 of the drawing, an elongated crystal separation and purification column 10 is closed at its upper and lower ends by closure members 11 and 12, respectively. The upper end of column 10 is provided with a compacting means, such as impervious piston 13, connected by a connecting rod 14 to a hydraulic piston 16 in hydraulic cylinder 17. Lines 18 and 19 serve to pass hydraulic fluid alternately into and out of cylinder 17 so as to drive piston 16 which in turn causes the movement of piston 13. It is within the scope of the invention to use a porous piston in which case the piston serves also as a filtering means. When operating the column with a porous piston, an outlet line is connected to the upper end of column 10 for removal of liquid therefrom. Filter section 21, disposed in an intermediate portion of column 10 comprises a filter medium such as a filter screen 22 surrounded by a jacket 23. Jacket 23 has a line 24 connected thereto for withdrawal of liquid from the filter section. Figure 4 of the drawing, which is a sectional view of filter section 21, shows in detail the various elements which comprise this section. The portion of column 10 below filter section 21 and in communication therewith comprises purification section 26. A heating means is positioned in the lower end of column 10 in order to provide a crystal melting section in that end of the column. As illustrated, the heating means is a coil 27 through which a heat transfer medium is circulated. It is not intended to limit the invention to the specific heating means shown, for other suitable means may be employed. For example, an electrical heater may be positioned next to closure member 12, a coil may be disposed around column 10 at its lower end, or an electrical bayonet type heater may be provided to extend into the end of the column. A liquid outlet line 28 is connected to the end of column 10 in order to provide means for removal of melt or a mixture of melt and crystals from the melting section.

Feed inlet line 31 leading from a source of feed material, not shown, and containing a pump 32 is connected to the inlet end of chiller 33. Chiller 33 may be any conventional type of refrigerating means such as a scraped surface chiller, or the chiller may be provided with an auger or piston for moving the crystal slurry formed therein through the chiller. Conduit 34 containing a surge tank 36 connects the discharge end of chiller 33 to filter 37.

Filter 37 comprises a cylindrical member 38 closed at one end by closure member 39 and having its other end connected to separation and purification column 10 at a point above filter section 21. It is noted that piston 13 is of such a length that during part of its downward stroke it completely blocks the opening of filter 37 into the column while at the end of its back stroke, the opening into the column is unobstructed so as to permit flow of material into the column. A filter medium such as a substantially cylindrical filter screen 41 is axially disposed within and spaced apart from cylindrical member 38 so as to provide annular space 42 between the filter screen and the walls of the cylindrical member. Conduit 34 extends into cylindrical member 38 so that the conduit communicates with the interior of the filter screen while outlet conduit 43 is in communication with annular space 42. A shaft 44 having mounted thereon a helix or screw 46 is axially disposed within cylindrical member 38. The outer end of shaft 44 is connected to motor 47 which provides means for rotating the shaft and helix within filter screen 41. Cylinder 48 connected to an intermediate portion of cylindrical member 38 is open at one end to annular space 42 and closed at its other end by closure member 49. Cylinder 48 is provided with a piston 51 which is connected by connecting rod 52 to hydraulic piston 53 in hydraulic cylinder 54.

Lines 56 and 57 provide means whereby hydraulic fluid is introduced into and withdrawn from hydraulic cylinder 54. Lines 56 and 57 are connected to a source of hydraulic fluid, not shown, by means of line 58 which is connected to the former lines through lines 59 and 61 and three-way valves 62 and 63. Lines 64 and 66 provide means for venting hydraulic fluid from hydraulic cylinder 54. Valves 62 and 63 as illustrated are solenoid operated valves, which are connected through suitable mechanical linkage 67 to solenoid 68. Mechanical linkage 67 comprises a vertical member 69, held in a downward position by means of spring 71 when solenoid 68 is not energized, and arms 72 and 73 operatively connected to valves 62 and 63. Electrical current to the solenoid is supplied by a source of alternating current 74 through electrical lead 76. Electrical lead 76 contains a switch 77 which is actuated on being contacted by a cam member 78 rigidly attached to connecting rod 14. Figures 2 and 3 illustrate the effect upon switch 77 of movement of cam 78 and will be discussed more in detail hereinafter in conjunction with the description of the operation of the apparatus of Figure 1. Outlet conduit 43 contains a solenoid valve 79 having its solenoid connected by electrical lead 81 to lead 76. The electrical system described hereinabove constitutes means for synchronizing the movement of piston 13 and backwash piston 51 during operation of the fractional crystallization apparatus. It is to be understood that it is not intended to limit the present invention to the specific control means described, for other means may be used which come within the scope and spirit of the invention.

While the fractional crystallization apparatus of Figure 1 is for the sake of clarity of understanding illustrated and described as occupying a substantially vertical position, it is not intended to so limit the invention. It is to be understood that the apparatus can be otherwise disposed without departing from the spirit or scope of the invention. Thus, the separation and purification column can be positioned horizontally, or still again the column can be operated vertically with the melting zone in the top of the column rather than the bottom as illustrated. Furthermore, while the invention has been described in conjunction with a separation and purification column which utilizes a piston as a crystal mover, the invention is not limited to any specific column, but rather it is applicable to any purification column which utilizes a displaced reflux stream to obtain a high purity product.

In the operation of the apparatus of Figure 1, a liquid feed, which may be a liquid multi-component mixture containing components of different melting points, is pumped from a source, not shown, by pump 32 into chiller 33. Chiller 33 is maintained at a temperature low enough to crystallize a portion of one of the components and form a slurry of crystals in mother liquor. The crystal slurry so formed is removed from the chiller through conduit 34 and passed through surge tank 36 into filter 37 wherein mother liquor is separated from the crystal slurry and withdrawn through conduit 43. The thickened slurry is then moved into crystal separation and purification column 10 through the action of helix 46 rotating with shaft 44 within filter screen 41.

As previously discussed, piston 13 is so constructed that introduction of material into the column is possible only when the lower end of the piston is above the open end of filter 37. The slurry on entering column 10 is moved downwardly by means of piston 13 into filter section 21. Piston 13 is forced downwardly and upwardly by means of hydraulic piston 16 which is moved in response to a hydraulic fluid introduced into and withdrawn from hydraulic cylinder 17 through lines 18 and 19. By operating in this manner, piston 13 on its compression stroke forces crystals downwardly through column 10 while on its back stroke crystal slurry is allowed to pass into the column from filter 37.

Within filter section 21 additional mother liquor is separated from the crystals and removed from the column through line 24. The crystals thereafter continue their movement as a uniform mass downwardly through the column as a result of the force exerted thereon by piston 13. Crystals on approaching the end of column 10 enter the melting zone maintained in the end of the column by heating means 27. The melting zone is maintained at a temperature at least as high as the melting point of the crystals by continuously circulating a heat exchange medium through the coil of the heating means. On reaching the melting zone, at least a portion of the crystals are melted, and a portion of the resulting melt is displaced upwardly as a reflux stream into the downwardly moving mass of crystals. The reflux stream on contacting the crystals upstream crystalwise of the melting zone displaces occluded impurities from the crystals by refreezing thereon. A liquid stream comprising displaced impurities is removed from column 10 through filter section 21 by means of line 24. A substantially pure product in the form of melt or a mixture of melt and crystals is withdrawn from the melting zone through line 28.

During the above described operation of the fractional crystallization apparatus, backwash piston 51 operates to maintain filter screen 41 of filter 37 free of crystals which may have a tendency to become embedded therein. In a preferred method for operating the backwash piston, the filter screen is subjected to a single backwash for each stroke of the column piston, and, normally, optimum results are obtained by applying the backwash liquid at the time when the column piston is near the bottom of its stroke. Since filter 37 and separation and purification column 10 are not in communication when the column piston is at the bottom of the stroke, by operating in this manner backwash liquid is prevented from entering the column. Furthermore, since the backwash liquid along with mother liquor is also removed from the filter during this period, a suitably thickened slurry may be fed to the column during the period when the column piston is in a raised position. It is within the contemplation of the invention to operate the backwash piston for two or more strokes for each stroke of the column piston, or if the slurry is not difficult to filter and the crystals do not readily plug the filter screen, it may then be advantageous to operate the backwash piston one stroke only for each two or more strokes of the column piston.

During the backwashing of the filter screen, it is desirable to operate so that the force of the backwash liquid is applied evenly to the filter screen at the very beginning of the backwash cycle. If the force of the backwash liquid is applied otherwise, it may happen that the screen will be cleaned only in spots, and these clean spots will further interfere with the backwashing by allowing the backwash liquid to channel instead of cleaning additional portions of the filter screen. With reference to the amount of backwash liquid to be used, it is advantageous to use as little liquid as possible since the liquid must be subsequently removed through the filter screen on the filtering cycle. With most materials the most effective backwashing is accomplished by using a high pressure for a short time, but with some materials it may be necessary to use an extended backwash cycle time in order to properly clean the filter screen.

Referring still to Figure 1 of the drawing filter screen 41 is backwashed by liquid forced inwardly from annular space 42 as a result of the movement of piston 51 in cylinder 48. Piston 51 is operated by hydraulic piston 53 which is moved by a suitable hydraulic fluid, such as air, supplied to cylinder 54 through line 58 and either line 56 or 57. The movement of piston 51 is synchronized with the movement of column piston 13 by a suitable control system. Thus, as connecting rod 14 moves downwardly, cam member 78 engages switch 77 causing the switch to close. In Figure 2, cam 78 is illustrated as moving downwardly so as to maintain switch assembly 77 in a closed position. As a result of the closing of switch 77, the electrical circuit from source 74 through switch 77, lead 76 and solenoid 68 is completed. Solenoid 68 is thereby energized causing vertical member 69 to be raised against the force of spring 71 and thereby changing the positions of arms 72 and 73 and causing three-way valves 62 and 63 to be positioned oppositely from that shown in Figure 1. Air now passes through line 58, line 59 and solenoid valve 62 and thence through line 56 into the lower portion of hydraulic cylinder 54. By passing air into the lower portion of cylinder 54, hydraulic piston 53 is moved upwardly, and concomitantly piston 51 moves upwardly in cylinder 48 forcing liquid from annular space 42 through filter screen 41. As a result of the backwash liquid being forced through filter screen 41, any crystals which may have been lodged within the filter screen are thereby removed. During the period when piston 53 is moving upwardly in hydraulic cylinder 54, air on the opposite side of the piston is vented through line 57, valve 63 and line 66.

By controlling the length of cam 78 and its position on connecting rod 14, the period during which backwashing is carried out can be closely controlled. Cam 78 is preferably constructed and positioned on connecting rod 14 so that switch 77 remains closed during the period when column piston 13 is near the bottom of its stroke. Thus, it is generally desirable to maintain switch 77 in a closed position whenever the face of piston 13 is below the level of the opening of filter 37 into column 10.

When cam 78 operates to complete the electrical circuit by closing switch 77, solenoid valve 79 contained in outlet line 43 is closed as a result of current flowing through lead 81. It is normally desirable to have the filter outlet conduit closed during the backwashing operation, for otherwise liquid from cylinder 48 and annular space 42 will be forced out through conduit 43 instead of through filter screen 41. Furthermore, if the filtering operation is allowed to continue when column piston 13 is blocking the entrance of filter 37 into column 10, the slurry within the filter may become so thick that it cannot be moved through the filter by helix 46. By applying the backwash liquid at a time when the filter outlet to the column is closed, the slurry is prevented from becoming too thick because of dilution of the slurry with the backwash liquid.

Filter 37 is normally liquid full. When liquid is forced back through the filter screen as a result of the backwashing operation, the flow of slurry in conduit 34 may be temporarily reversed. Surge tank 36 installed in conduit 34 provides additional volume for liquid forced out of the filter during backwashing of the filter screen.

When column piston 13 reaches the bottom of its stroke, which is normally about the center of filter section 21, the direction of movement of the piston is reversed. Aes the piston moves upwardly, cam 78 operates to open switch 77 thereby terminating the flow of current to solenoid valve 79 and solenoid 68. The interaction of cam 78 and switch 77 during upward movement of the cam is illustrated in Figure 3. Upon solenoid 68 becoming deenergized vertical member 69 is moved downwardly by spring 71. As a result of the movement of vertical member 69, arms 72 and 73 are also moved downwardly returning valves 62 and 63 to the position shown in Figure 1. Air from line 58 now flows through line 61 and valve 63 entering the top of hydraulic cylinder 54 through line 57. As a result of introducing air into the upper part of cylinder 54, piston 53 is forced downwardly, caryring with it backwash piston 51. Air on the underside of piston 53 is vented through line 56, valve 62 and line 64.

As a result of the opening of switch 77, solenoid valve 79 in outlet conduit 43 is also opened. Accordingly, during the period when column piston 13 is positioned so that slurry may move from filter 37 into the column, mother liquor separated from the crystal slurry is withdrawn from the filter through conduit 43. During this same period, backwash piston 51 is on its downward stroke, and the filter screen is not being subjected to the action of the backwash liquid.

The time required for backwash piston 51 to travel its entire stroke or any desired portion thereof is a function of the volume of cylinder 48, the physical characteristics of the crystals being filtered, the piston drive pressure, screen size, etc. In filtering para-xylene crystals, for example, it has been found that about ten seconds is a suitable backwash period, but the period may vary from one second to as much as ten minutes. As previously mentioned, cam 78 can be so constructed and positioned on connecting rod 14 that switch 77 will be maintained in a closed position for the desired length of time during which the backwashing operation is to be carried out. In some instances it may be desirable to provide means for manually controlling the operation of piston 51 so that movement of column piston 13 may be stopped while several backwash strokes are applied to the piston screen. This type of operation may be necessary if the filter screen should become partially plugged during normal operation.

A more comprehensive understanding of the invention may be obtained by reference to the following illustrative example which is not intended, however, to be unduly limitative of the invention.

A feed material containing about 40 weight percent para-xylene is charged to the chiller of fractional crystallization apparatus similar to that of Figure 1 at a temperature of about 90° F. and a rate of 1000 pounds per hour. The feed mixture is cooled in the chiller to a temperature of —62° F., causing para-xylene to crystallize and form a slurry containing 30 percent solids. The slurry is introduced into the in-line prefilter where mother liquor containing 14.3 percent para-xylene is separated from the slurry at a rate of 300 pounds per hour. The resulting slurry, still at about —62° F. and containing 43 percent solids is then passed into the crystal separation and purification column. The slurry is moved through the column by means of a piston into the filter section where additional mother liquor containing 14.3 weight percent para-xylene is recovered at a rate of 395 pounds per hour. The mass of crystals as a result of the force exerted thereon by the column piston moves through the column toward the melting zone maintained in the end of the column at a temperature above the melting point of the para-xylene crystals. A stream containing 98.6 weight percent para-xylene is withdrawn from the melting zone at a rate of 305 pounds per hour as a product of the process. The backwash piston of the in-line prefilter is operated at one stroke for each stroke of the column piston and returns about six percent of the mother liquor to the slurry inside the prefilter through the filter medium. The duration of each stroke of the backwash piston is about 3 seconds, i. e., the backwash piston is operated at a drive pressure sufficiently high to force the backwash material through the filter medium during a period of about 3 seconds. Where, as in this example, the mother liquor removal rate from the prefilter is 300 pounds per hour, the amount of backwash liquid used for each stroke of the backwash piston is about 18 pounds per hour, resulting in 318 pounds per hour of mother liquor being filtered through the filter medium.

It will be apparent to those skilled in the art that various modifications of the invention can be made upon study of the accompanying disclosure. Such modifications are believed to be clearly within the spirit and scope of the invention.

I claim:

1. Fractional crystallization apparatus comprising, in combination, an elongated, closed purification column; a heating means operatively connected to one end of said column; means for withdrawing a purified product from said end of said column; internal filtering means in an intermediate portion of said column; a crystal mover in the opposite end of said column from said heating means, said crystal mover being adapted to move within said column at least up to said filtering means; a substantially cylindrical member closed at one end and having its other end connected to said column upstream crystalwise of said filtering means; a substantially cylindrical filter medium disposed within and spaced apart from said cylindrical member so as to form an annular space therebetween; a crystal slurry inlet means connected to said cylindrical member and in communication with the interior of said filter medium; liquid outlet means connected to said cylindrical member and in communication with said annular space; means for moving crystals longitudinally within said filter medium and into said purification column; a cylinder closed at one end and having its other end attached to an intermediate portion of said cylindrical member; a piston disposed within said cylinder, said piston being adapted to force liquid from said annular space through said filter medium; and means for synchronizing the movement of said piston with said crystal mover so that said end of said substantially cylindrical member connected to said column is closed by said crystal mover when said piston is forcing liquid from said annular space through said filter medium.

2. Fractional crystallization apparatus comprising, in combination, an elongated, closed purification column; a heating means operatively connected to one end of said column; means for withdrawing a purified product from said end of said column; internal filtering means in an intermediate portion of said column; a piston in the opposite end of said column from said heating means, said piston being adapted to move within said column on its compression stroke to about the middle of said filtering means; a substantially cylindrical member closed at one end and having its other end connected to said column upstream crystalwise of said filtering means; a substantially cylindrical filter medium disposed within and spaced apart from said cylindrical member so as to form an annular space therebetween; a crystal slurry inlet means connected to said cylindrical member and in communication with the interior of said filter medium; liquid outlet means connected to said cylindrical member and in communication with said annular space; an auger positioned within said cylindrical member adjacent said filter medium; a cylinder closed at one end and having its other end attached to an intermediate portion of said cylindrical member; a backwash piston disposed within said cylinder, said piston being adapted to force liquid from said annular space through said filter medium; a hydraulic cylinder positioned adjacent said cylinder; a hydraulic piston in said hydraulic cylinder, said piston being operatively connected to said backwash piston; first conduit means for introducing and withdrawing hydraulic fluid from one end of said hydraulic cylinder; second conduit means for introducing and withdrawing hydraulic fluid from the opposite end of said hydraulic cylinder and means for synchronizing the movement of said backwash piston with said column piston so that said column piston closes said end of said substantially cylindrical member connected to said column when said backwash piston is forcing liquid from said annular space through said filter medium.

3. The apparatus of claim 2 in which said means for synchronizing the movement of said piston within said column with said backwash piston, comprises a first three-way valve, said valve being connected to said first conduit means; a second three-way valve, said valve being connected to said second conduit means; a hydraulic fluid inlet line, said line being connected to each said first and second three-way valves; a first fluid outlet line connected to said first three-way valve; a second fluid outlet line connected to said second three-way valve; and means for actuating said first and second three-way valves in response to movement of said column piston so that hydraulic fluid is introduced into said hydraulic cylinder through said first conduit means and withdrawn therefrom through said second fluid outlet line during the compression stroke of said column piston, and so that hydraulic fluid is introduced into said hydraulic cylinder through said second conduit means and withdrawn therefrom through said first fluid outlet line during the back stroke of said column piston.

4. In a process for separating a component from a multi-component mixture, said component forming crystals upon the cooling of said mixture, which comprises introducing a slurry of said crystals in mother liquor into a purification zone, separating mother liquor from said slurry in the upstream portion, with respect to crystal movement of said purification zone, moving crystals through said purification zone toward a melting zone in the downstream end, with respect to crystal movement, of said purification zone, melting crystals in said melting zone, displacing a portion of the resulting melt into said moving crystals, and recovering a purified product from said melting zone, the improvement comprising introducing said slurry of crystals in mother liquor into a prefiltering zone; withdrawing mother liquor through a filter medium within said prefiltering zone; introducing the resulting thickened slurry of crystals in mother liquor into said purification zone; terminating the introduction of said thickened slurry into said purification zone during downstream movement of crystals within said purification zone; backwashing said filter medium with mother liquor separated from said crystal slurry within said prefiltering zone said backwashing occurring only while introduction of said thickened crystal slurry into said purification zone is terminated; and thereafter resuming the introduction of thickened crystal slurry into said purification zone.

5. The process of claim 4 in which said multi-component mixture comprises alkylbenzenes.

6. The process of claim 5 in which said mixture contains para-xylene and said para-xylene is recovered as the product.

7. The process of claim 4 in which said multi-component mixture comprises benzene and a paraffinic hydrocarbon, and benzene is recovered as the product.

8. The process of claim 4 in which said multi-component mixture comprises cyclohexane and a paraffinic hydrocarbon, and cyclohexane is recovered as the product.

9. A process for separating a component from a liquid multi-component mixture, said component forming crystals upon the cooling of said mixture, which comprises introducing said mixture into a cooling zone and cooling said mixture therein to a temperature such as to form a slurry of crystals in mother liquor; flowing said slurry into a first filter zone and withdrawing mother liquor through a filter medium; introducing the resulting thickened slurry of crystals in mother liquor into an elongated purification zone; removing additional mother liquor from a second filter zone in the upstream portion, with respect to crystal movement, of said purification zone so as to form a mass of crystals therein; moving said mass of crystals through said purification zone toward a melting zone in the downstream end, with respect to crystal movement, of said purification zone; terminating the introduction of thickened crystal slurry into said purification zone during the downstream movement of said mass of crystals within said purification zone; backwashing said filter medium with mother liquor separated from said crystal slurry in said first filter zone during the time introduction of said thickened crystal slurry is terminated; upon completion of said backwashing resuming introduction of thickened crystal slurry into said purification zone; melting crystals in said melting zone; displacing a portion of the resulting melt into said moving mass of crystals; and recovering a purified product from said melting zone.

10. Fractional crystallization apparatus comprising, in combination, an elongated, closed purification column; a heating means associated with one end of said column; means for withdrawing a purified product from said end of said column; internal filtering means in an intermediate portion of said column; a substantially cylindrical member closed at one end and having its other end connected to said column upstream crystalwise of said filtering means; a crystal mover in the opposite end of said column from said heat exchange means, said crystal mover during movement within said column being adapted to close said end of said substantially cylindrical member connected to said column; a substantially cylindrical filter medium disposed within and spaced apart from said cylindrical member so as to form an annular space therebetween; a crystal slurry inlet means connected to said cylindrical member and in communication with the interior of said filter medium; liquid outlet means connected to said cylindrical member and in communication with said annular space; means for moving crystals longitudinally within said filter medium and into said purification column; means for passing liquid into said annular space and through said filter medium; and means for controlling said last-mentioned means so that liquid is passed into said annular space only when said end of said substantially cylindrical member connected to said column is closed by said crystal mover.

References Cited in the file of this patent

UNITED STATES PATENTS

| | | |
|---|---|---|
| 1,443,983 | Erdmann | Feb. 6, 1923 |
| 1,766,033 | Meakin | June 24, 1930 |
| 2,569,748 | De Grave | Oct. 2, 1951 |
| 2,593,300 | Hackmuth | Apr. 15, 1952 |
| 2,617,274 | Schmidt | Nov. 11, 1952 |
| 2,731,456 | Weedman | Jan. 17, 1956 |
| 2,747,001 | Weedman | May 22, 1956 |

FOREIGN PATENTS

| | | |
|---|---|---|
| 490,043 | Germany | Jan. 25, 1930 |